UNITED STATES PATENT OFFICE.

ARTHUR GEORGE GREEN, OF LONDON, ENGLAND, ASSIGNOR TO BROOKE, SIMPSON & SPILLER, LIMITED, OF SAME PLACE.

RED AZO DYE.

SPECIFICATION forming part of Letters Patent No. 515,764, dated March 6, 1894.

Application filed July 7, 1893. Serial No. 479,823. (Specimens.)

*To all whom it may concern:*

Be it known that I, ARTHUR GEORGE GREEN, fellow of the Institute of Chemistry and chemist to Brooke, Simpson & Spiller, Limited, of Atlas Works, Hackney Wick, aniline-dye manufacturers, a subject of the Queen of Great Britain and Ireland, and a resident of Atlas Works, Hackney Wick, London, in the county of Middlesex, England, have invented certain new and useful Improvements in the Manufacture of Azo Coloring-Matters, of which the following is a specification.

This invention relates to the manufacture of coloring-matters, which dye wool bright shades of scarlet from an acid bath, and are remarkable for their extreme fastness to milling and scouring, which renders them available for various purposes for which the azo-scarlets have up to the present been inapplicable.

I obtain these colors by combining the tetrazo compound of an aromatic azoxyamine, such as azoxyanilin (melting point 145° centigrade); azoxyorthotoluidin (melting point 168° centigrade); azoxyorthotoluidin (melting point 148° centigrade); azoxyparatoluidin (melting point 148° centigrade); or azoxymetaxylidin (melting point 143° centigrade); or the tetrazo compound of an aromatic azoamine, such as azoanilin azoorthotoluidin (melting point 203° centigrade); azoorthotoluidin (melting point 175° centigrade); or azoparatoluidin (melting point 159° centigrade); with one molecule of alpha-naphthol-parasulfonic acid (corresponding to Piria's naphthionic acid) and one molecule of beta-naphthol. The combination with the alpha-naphthol-para-sulfonic acid takes place in slightly acid solution, an intermediate compound being formed, which still contains a diazo group; on adding an alkaline solution of beta-naphthol, further combination takes place and the color is produced. The colors being very sparingly soluble separate completely from the solution.

The following instance may be given as an example of the method of carrying out my invention. A solution of fourteen pounds of sodium nitrite (ninety-six per cent.) in twenty gallons of water, is added gradually to an iced solution of twenty-five and one-half pounds of azoxyorthotoluidin of melting point 168° centigrade, dissolved in one hundred gallons of water containing four and one-half gallons of hydrochloric acid (thirty-one per cent.). The solution of the tetrazo compound thus obtained is then added to a solution of twenty-five pounds of sodium-alpha-naphthol-para-sulfonate and about twenty pounds of crystallized sodium acetate in one hundred gallons of water. A solution of fourteen and one-half pounds of beta-naphthol in thirty gallons of water, containing ten pounds of caustic soda is then run in. When the combination is complete, the color is filtered off and dried, or is brought into commerce in the form of paste. It dyes wool a brilliant scarlet from a boiling acid bath.

The process is substantially the same, if any other of the above mentioned azoxy and azo bases is employed, the quantities used being in proportion to the respective molecular weights. The shade of the color obtained is about the same from the azoorthotoluidin (melting point 203° centigrade) as from the azoxyorthotoluidin (melting point 168° centigrade) while from the azoxyanilin azoanilin azoxyorthotoluidin (melting point 148° centigrade), azoorthotoluidin (melting point 175° centigrade), azoxyparatoluidin (melting point 148° centigrade), and azoparatoluidin (melting point 159° centigrade), yellow shades of scarlet are obtained. On the other hand azoxymetaxylidin (melting point 143° centigrade) gives a bluer scarlet.

The coloring matter, obtained by means of my invention, is a deep red powder, becoming of a green bronze color when rubbed with a hard substance, such as an agate burnisher. It is very sparingly soluble in cold water, in which it first floats about forming flocks, which subsequently break up, producing an orange colored solution, which is not perfectly transparent. In boiling water it is rather more soluble, a strong solution when cooled having a slightly glutinous appearance. Strong mineral acids do not affect weak solutions, but if the solutions are strong, the coloring matter is precipitated in a flocculent state. Strong alkalies also do not affect the solutions, unless the said solutions are strong, in which case they cause a flocculent precipitate, which is yellower in color than that caused by the acids. Strong sulfuric acid dissolves the color, producing a deep plum colored solution. On pouring this into water the color separates in orange colored flocks, while if water is added to the said sulfuric acid solution, the color separates as a deep chocolate brown precipitate, which becomes pale red on the addition of a large quantity of cold water.

The color dyes wool a bright scarlet, when boiled with it for an hour or more in a bath acidulated with sulfuric, or other mineral acid. The dyed wool is not changed in color by the action of acids, or alkalies and the color is extremely fast when the dyed fabric is boiled in a soap solution, or when subjected to other usual tests, the dyed color exceeds hitherto known azo red dyes in its power of resistance.

Having now described my invention, what I claim, and desire to secure by Letters Patent, is—

1. The herein described process for the preparation of a coloring matter, consisting in the combination of the tetrazo compound of one of the aromatic azoxy and azoamins described, with one molecule of alpha-naphthol-para-sulfonic acid and one molecule of beta-naphthol, and finally precipitating the coloring matter, substantially as described.

2. As a new article of manufacture, a coloring matter derived from one of the aromatic azoxy and azoamins described, and consisting of a deep red powder, becoming of green bronze color when rubbed with a hard substance, sparingly soluble in cold water, more soluble in boiling water, weak solutions unaffected by strong mineral acids or alkalies, but in strong solutions color precipitated in flocculent state thereby, said color dissolving in strong sulfuric acid with a deep plum color, changing to chocolate brown precipitate and then pale red on addition of cold water, dyeing woolen goods in acid bath a bright scarlet, resisting the action of soap in milling and scouring and not altered in color by the action of acids and alkalies, substantially as described.

In witness whereof I have hereunto set my hand in the presence of two witnesses.

ARTHUR GEORGE GREEN.

Witnesses:
R. J. FRISWELL,
W. DES. BROOKE.